US008060275B2

(12) United States Patent
Asgari et al.

(10) Patent No.: US 8,060,275 B2
(45) Date of Patent: Nov. 15, 2011

(54) ROUGH ROAD DETECTION SYSTEM USED IN AN ON-BOARD DIAGNOSTIC SYSTEM

(75) Inventors: Jahan Asgari, Dearborn, MI (US);
Timothy Feldkamp, Ann Arbor, MI (US); Craig Stephens, Canton, MI (US);
Moses Fridman, Birmingham, MI (US);
Davor Hrovat, Ann Arbor, MI (US);
Arthur Varady, Chelsea, MI (US);
Mitch McConnell, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1144 days.

(21) Appl. No.: 11/625,198

(22) Filed: Jan. 19, 2007

(65) Prior Publication Data

US 2008/0177437 A1   Jul. 24, 2008

(51) Int. Cl.
*G06F 19/00* (2006.01)
*G06F 7/00* (2006.01)
*B60T 8/00* (2006.01)

(52) U.S. Cl. .......... 701/31; 701/1; 701/29; 701/34; 701/35; 701/71; 701/72; 701/73; 701/74; 701/75; 701/76; 701/77; 701/80; 701/11; 303/121; 303/122; 303/122.05; 303/147; 303/148; 303/149; 303/150; 73/114.01; 73/114.02; 73/114.04; 73/114.05; 73/114.12; 714/25; 714/26; 714/100; 123/406.12; 123/406.13; 123/406.14; 123/406.24; 123/406.25; 123/406.5; 123/406.51; 477/106; 477/182; 477/183; 477/184; 477/186; 477/187; 477/203

(58) Field of Classification Search .......... 701/1, 29, 701/31, 34, 35, 71–77, 80, 111; 303/121, 303/122, 122.05, 147–150; 73/114.01, 114.02, 73/114.04, 114.12, 114.05; 714/25, 26, 100; 123/406.12, 406.13, 406.14, 406.24, 406.25, 123/406.5, 406.51; 477/106, 182–184, 186, 477/187, 203

See application file for complete search history.

(56) References Cited

U.S. PATENT DOCUMENTS

| | | | | |
|---|---|---|---|---|
| 4,651,290 A * | 3/1987 | Masaki et al. | .................. | 701/80 |
| 5,237,504 A * | 8/1993 | Holmes et al. | ................ | 701/111 |
| 5,305,635 A * | 4/1994 | James et al. | ............... | 73/114.02 |
| 5,394,744 A * | 3/1995 | James et al. | ............... | 73/114.02 |
| 5,544,521 A * | 8/1996 | McCombie | ................ | 73/114.04 |
| 5,592,388 A * | 1/1997 | Bradshaw et al. | ........... | 701/111 |
| 5,633,456 A * | 5/1997 | Stander | ..................... | 73/114.04 |
| 6,266,602 B1 | 7/2001 | Yamaura | | |
| 6,385,525 B2 * | 5/2002 | Watanabe et al. | ............... | 701/80 |
| 6,522,968 B1 | 2/2003 | Ito et al. | | |
| 6,640,623 B2 | 11/2003 | Ono et al. | | |
| 6,738,704 B2 | 5/2004 | Kawasaki | | |

(Continued)

FOREIGN PATENT DOCUMENTS

DE      4115032      11/1992

(Continued)

*Primary Examiner* — John Nguyen
*Assistant Examiner* — Chuong Nguyen
(74) *Attorney, Agent, or Firm* — Fredrick Vernon Owens; Alleman Hall McCoy Russell & Tuttle LLP (57) ABSTRACT

An on-board diagnostic system of a vehicle comprises disabling diagnostic operation, such as a misfire monitor, based on road roughness. In one example, the disabling of the diagnostic operation is based on brake actuation and degradation of an anti-lock braking system.

7 Claims, 8 Drawing Sheets

U.S. PATENT DOCUMENTS

| | | | |
|---|---|---|---|
| 6,885,923 B1 * | 4/2005 | Faymon et al. | 701/29 |
| 6,907,778 B2 | 6/2005 | Kogure et al. | |
| 7,292,933 B2 * | 11/2007 | Christensen | 701/111 |
| 2003/0088355 A1 * | 5/2003 | Fuhrer et al. | 701/93 |
| 2003/0163242 A1 | 8/2003 | Miyauchi et al. | |
| 2004/0098187 A1 | 5/2004 | Nakao | |
| 2004/0230375 A1 | 11/2004 | Matsumoto et al. | |
| 2005/0065700 A1 | 3/2005 | Kogure | |
| 2005/0102086 A1 | 5/2005 | Nakao | |
| 2005/0125153 A1 | 6/2005 | Matsumoto et al. | |
| 2006/0253248 A1 * | 11/2006 | Ames et al. | 701/207 |
| 2006/0288767 A1 | 12/2006 | Hernandez | |
| 2007/0095130 A1 * | 5/2007 | Assaf et al. | 73/104 |

FOREIGN PATENT DOCUMENTS

| | | | |
|---|---|---|---|
| DE | 10011706 | | 6/2001 |
| DE | 4340746 | | 11/2003 |
| DE | 10308627 | | 4/2004 |
| JP | 2976684 | * | 11/1999 |
| WO | 2005/068271 | | 7/2005 |

* cited by examiner

ROUGH ROAD DETECTION SYSTEM USED IN AN ON-BOARD DIAGNOSTIC SYSTEM

FIELD OF INVENTION

The present application relates to a rough road detection system, specifically, a rough road detection system used in an on-board diagnostic system to reduce false positive errors from a diagnostic component.

BACKGROUND

Various engine components of a vehicle perform different control operations. Diagnostic components may be used in a control system to provide error outputs to indicate that an engine operation is not normal. However, the roughness of a road surface may create false positives (alpha errors) in the diagnostic components. For example, an emission oriented on-board diagnostic system (OBD II) in a vehicle may include a misfire monitor to detect misfires that may cause an overall rise in hydrocarbon emissions. The misfire monitor can be prone to false positives under extreme road surface conditions. In another example, the roughness of the road may result in an inaccurate estimation of a road surface frictional coefficient which is used to control four wheel driving and automatic braking. Thus, some engine or vehicle control operations may not be accurately performed under a rough road condition.

SUMMARY OF THE INVENTION

According to one aspect of the invention, an on-board diagnostic system of a vehicle is provided to address the above-described conditions. The on-board diagnostic system comprises a diagnostic component configured to detect a vehicle operating condition and to produce an error output when the vehicle operating condition is determined to be abnormal; and a rough road detector configured to determine an average level of roughness of a road surface based on signals from wheel speed sensors, to compare the roughness with a predetermined threshold, and to disable the error output of the diagnostic component if the roughness level has exceeded the predetermined threshold.

According to another aspect, a road surface condition detector for a vehicle is provided. The road surface condition detector comprises a filter, such as a high pass filter or band pass filter, which is configured to receive input of non-driven wheel speeds from wheel speed sensors, and to determine changes of wheel speed in order to produce an output indicating a current magnitude of roughness of a road surface; a rolling average filter configured to process the output of the high pass filter such that an average roughness of the road surface is determined over a predetermined time interval; and a comparator configured to compare an output from the rolling average filter to a predetermined calibratable threshold to determine whether the average roughness of the road surface has exceeded the threshold to determine a type of a road surface; wherein the comparator output is used to reduce false errors of a diagnostic component of a vehicle.

According to yet another aspect, a method to reduce false positives from a diagnostic component in a vehicle traveling on a road is provided. The method comprises receiving input signals from wheel speed sensors; determining changes of the input signals using a high pass filter so that output signals from the high pass filter indicate a current magnitude of external roughness of the road surface; processing the output signals from the high pass filter using a rolling average filter so that a roughness level is determined over a predetermined time interval; comparing the output signals from the rolling average filter to a predetermined threshold; and disabling an error output of the diagnostic component if the roughness level has exceeded the predetermined threshold.

The use of a rough road detector (RRD) can reduce false errors from a diagnostic component. In the case where the diagnostic component is a misfire monitor, once the misfire monitor receives the RRD flag, a control system may instruct the misfire monitor to disable the misfire output, switch to an alternate calibration, or deactivate the misfire monitor while traveling over a rough road.

DETAILED DESCRIPTION OF THE PREFERRED EMBODIMENTS

Figure 1:
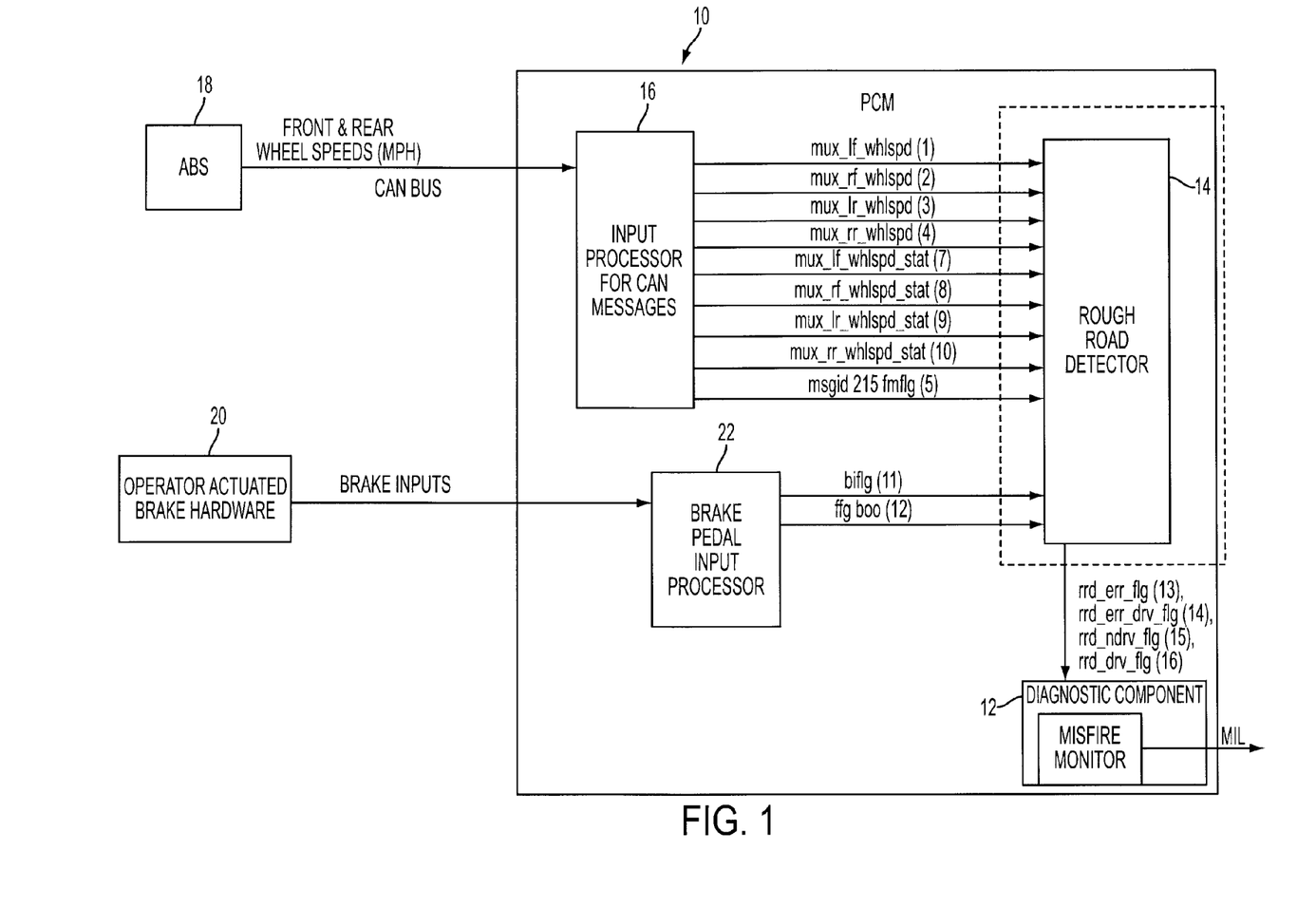
FIG. 1 is a block diagram illustrating an exemplary on-board diagnostic system for a vehicle.

FIG. 1 is a block diagram illustrating an exemplary on-board diagnostic system 10 for a vehicle. System 10 may include a diagnostic component 12 configured to detect a vehicle operation condition and to produce an error output when the vehicle operation condition is determined to be abnormal. In the depicted embodiment, diagnostic component 12 includes a misfire monitor used in an on-board diagnostic system II (OBD II). The misfire monitor may indicate misfire by lighting a malfunction indicator lamp (MIL), and the output of the misfire monitor may be used in various engine controls. The misfire monitor may be prone to false positives (alpha error) under rough road conditions such as the large cobblestone lanes, which can cause driveline disturbances that are incorrectly interpreted as misfires by the misfire monitor. A noise disablement feature present in the misfire monitor may not be effective in reducing these errors. Incorrect misfire determinations can cause the engine to be controlled in a less than optimal manner, as corrective measures for misfiring may be taken when unneeded. To reduce the undesirable effect of falsely detected errors, a rough road detector 14 may used to determine a level of roughness of the road, and account for the possibility of false errors by disabling or ignoring the output of the misfire monitor.

It should be appreciated that diagnostic component 12 may include other engine control or vehicle control monitors where the accuracy of the diagnostics may be dependent upon the roughness of the road. Examples of other alternative diagnostic components 12 include a stability control monitor, a traction control monitor, etc.

Continuing with FIG. 1, rough road detector 14 of system 10 is configured to process wheel speed signals and other inputs, output an average roughness level, and set a roughness flag for diagnostic component 12. The operation of rough road detector 14 will be described with reference to FIG. 2 in detail below.

In some embodiments, input signals to the rough road detector may be processed by an input processor 16. For example, input processor 16 may be a controller area network (CAN) message input processor 16 that is configured to receive wheel speed signals from an anti-lock brake system (ABS) control unit 18 via a CAN Bus. Wheel speeds may be detected by wheel speed sensors installed on the front and rear wheels of the vehicle. The signals processed by input processor 16 for CAN messages may include wheel speeds of the four wheels (respectively referred to by the variables mux_lf_whlspd, mux_rf_whlspd, mux_lr_whlspd, and mux_rr_whlspd). Additionally, the processed signals may include status of the wheel speed (mux_lf_whlspd_stat). The status indicators mux_lf_whlspd_stat, mux_rf_whlspd_stat, mux_lr_whlspd_stat, and mux_rr_whlspd_stat indicate if a given wheel speed is valid. Further, the processed signals may include an ABS failure flag (msgid_215_fmflg) to indicate if ABS control unit 18 is degraded. Because the wheel speeds are dependant upon ABS unit 18, rough road detector 14 may be configured to turn off rough road calculation in case of degraded ABS performance.

In some embodiments, operator actuated brake hardware 20 may provide a brake input to brake application input processor 22. The signals processed by brake application input processor 22 may include brake on/off indicator (biflg) that indicates whether the operator is currently applying the brakes. In some situations, the application of the brakes may reduce the accuracy of rough road level. Thus, rough road calculation may be suspended by the rough road detector when application of the brakes is detected. Additionally, or alternatively, brake pedal fault flag (ffg_boo) may be used as an input to rough road detector 14. Since an indication of the brake pedal status may be needed, rough road detector 14 may be turned off in case of degradation in the brake application.

Outputs from rough road detector 14 may include roughness indicators to indicate an average roughness level. In some embodiments, the roughness indicator may include an indicator (rrd_err_flg) which is determined from non-driven wheel speeds. Alternatively, the roughness indicator may include an indicator (rrd_err_drv_flg), which is determined from driven wheel speeds. The error flags indicate that a roughness level cannot be computed due to an error in the necessary inputs to the RRD, thus the output of the RRD should be ignored by the diagnostic component. In one example, errors may be due to faulty inputs such as invalid wheel speeds etc. In some embodiments, the roughness indicator may include an indicator (rrd_ndrv_lvl) which is determined from non-driven wheel speeds. Alternatively, the roughness indicator may include an indicator (rrd_drv_lvl), which is determined from driven wheel speeds. Further, rough road detector 14 may set rough road flags for diagnostic component 12 based on roughness indicator or level and a predetermined threshold. A rough road flag (rrd_ndr_flg) determined from the non-driven wheel speeds, and/or a rough road flag (rrd_drv_flg) determined from the driven wheel speeds may be utilized. Once a rough road flag is received by diagnostic component 12, control system 10 may disable the error output of diagnostic component 12 or control system 10 may switch to an alternative calibration. It should be noted that the input signals to rough road detector 14 may include either non-driven wheel speeds or driven wheel speeds, or both non-driven and driven wheel speeds in the determination of roughness level.

Figure 2:
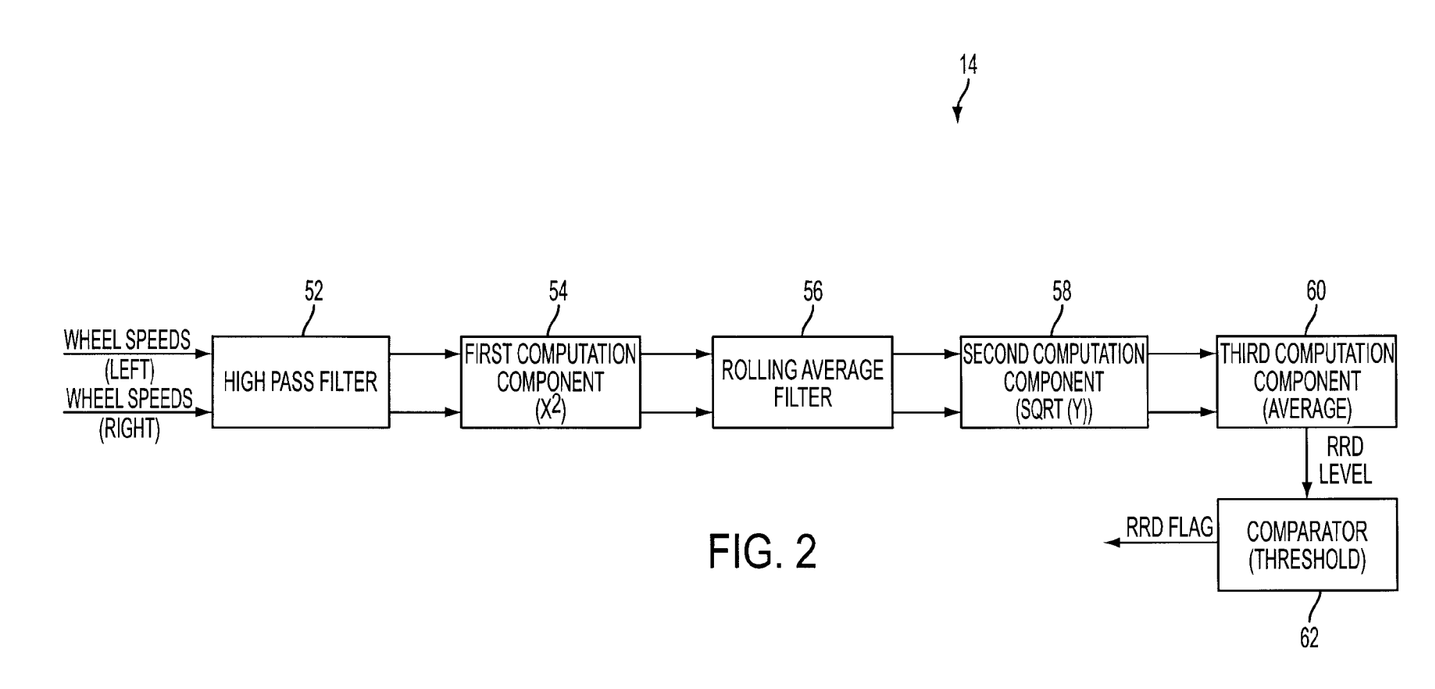
FIG. 2 is a block diagram illustrating an exemplary rough road detector of the on-board diagnostic system of FIG. 1.

FIG. 2 is a block diagram illustrating a general system structure of an exemplary rough road detector 14. Rough road detector 14 may be used to reduce false errors of a diagnostic component of a vehicle where the false errors are likely to occur while traveling on a rough road. The term "rough road" refers to roads having projections or depressions in the road surface, such as cobblestones, potholes, bumps, etc.

Rough road detector 14 is typically run to calculate whether a road is rough or not in successive time intervals. Each run of rough road detector 14 may depend upon the time interval that the wheel speeds are received over the CAN bus. For example, if the wheel speeds are updated every 10 milliseconds (ms), rough road detector 14 may run every 8 ms. In another example, if the wheel speeds are updated at a relatively slow rate, such as every 20 or 30 ms, rough road detector 14 may run every 16 ms. Alternatively, the wheel speeds may be stored and processed at lower rate.

Figure 3:
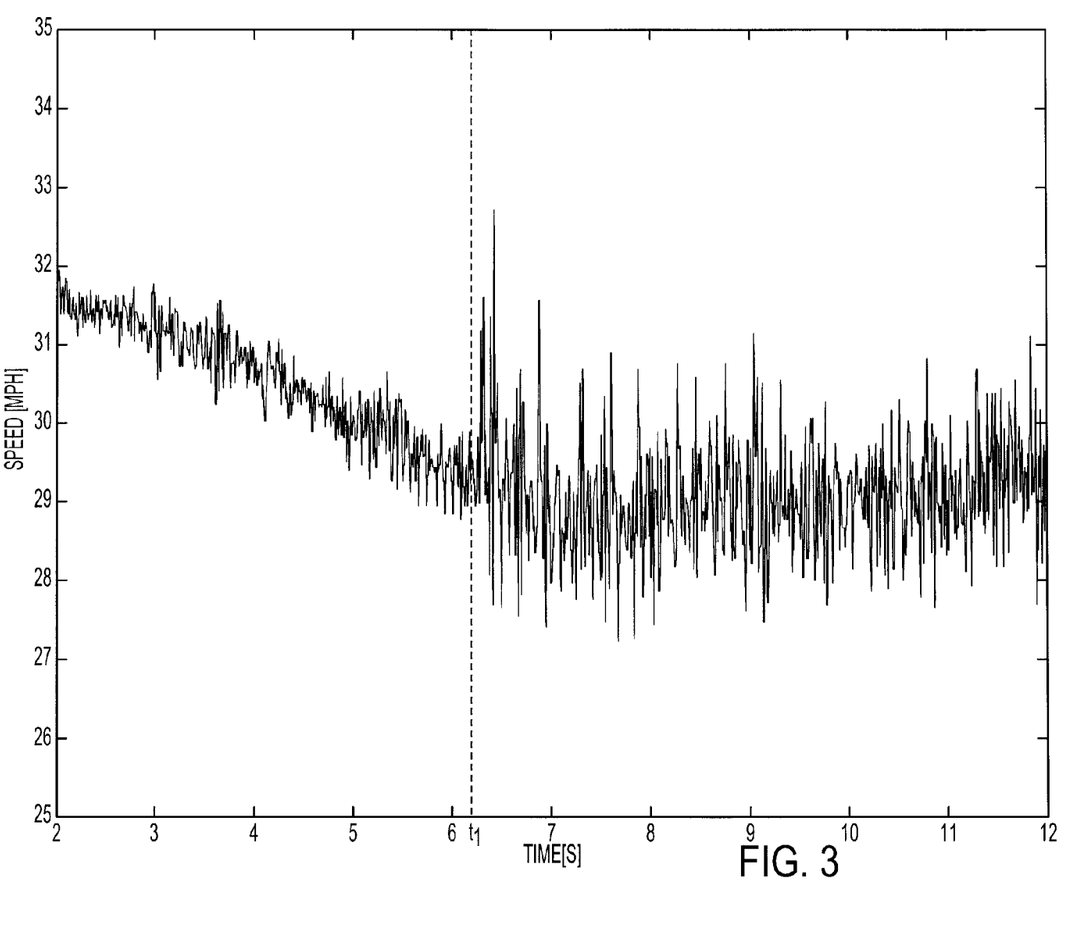
FIG. 3 shows the changes of wheel speed of one non-driven wheel (miles per hour) of a vehicle with time (seconds).

FIG. 3 shows changes of non-driven wheel speeds (miles per hour) of a vehicle with time (seconds). Projections or depressions on the road surface such as large bumps and potholes may appear as short term disturbances in the wheel speeds. The disturbances are reflected as rapid changes of wheel speeds. Thus, as shown in FIG. 3, the vehicle drives on a smooth road before time t1. After t1, the vehicle drives on a rough road.

The original wheel speeds as shown in FIG. 3 may be pre-processed by a first filter. Now referring to FIG. 2, the first filter may be used to remove slowly changing components of the wheel speed signals which do not reflect the disturbance of wheel speed due to projections or depressions causing roughness in a road surface. In the depicted embodiment, the first filter may include a high pass filter 52. High pass filter 52 allows passage of only the high band component of the wavelength. High pass filter 52 may remove slowly changing components or semi steady state components of the wheel speed signals. Thus, output signals from high pass filter 52 show the underlying magnitude of external disturbance acting upon the wheels or roughness of the road surface. In some embodiments, high pass filter 52 may include a second-order Butterworth high pass filter. The filter coefficients may be calibratable so that the cutoff frequency may be tuned for various vehicle platforms. In one embodiment, a cutoff frequency of 2 Hz is used as the cutoff frequency of the high pass filter. It should be appreciated that any suitable filter may be used as the first filter. For example, the first filter may include a band pass filter.

A first computation component 54 may be used to compute the square of outputs from high pass filter 52. The computed data may be processed by a second filter to obtain a usable quantity to indicate a level of roughness. In the depicted embodiment, the second filter is a rolling average filter 56.

In some embodiments, rolling average filter 56 may be equivalent to a low pass filter with 0.2 Hz cutoff frequency. In one example, rolling average filter 56 may be applied to the square of the high pass filtered wheel speed with a cutoff value of 2 seconds. The cutoff frequency of rolling average filter 56 may inversely correspond to the time interval or the response time of the filter and is calibratable. Rolling average filter 56 may be configured to provide enough smoothing so that consistent output may be obtained for a specific road. However, the rolling average filter may also be sufficiently responsive to allow quick adaptation if the road surface changes. Further, it should be noted that the response time of the rolling average filter should be set long enough so that RRD flag does not switch too frequently between rough and smooth. Thus, in some embodiments, hysteresis may be added on the final output to prevent unwanted switching.

Data filtered by rolling average filter may be further processed. For example, a second computation component 58 may take the square root of wheel speeds filtered by rolling average filter 56. Then, a third computation component 60 may average the results for the left wheel and the right wheel if inputs from both wheels are valid. Alternatively, wheel speed signals from either the left wheel or the right wheel may be used to determine a roughness level of a road.

Figure 4:
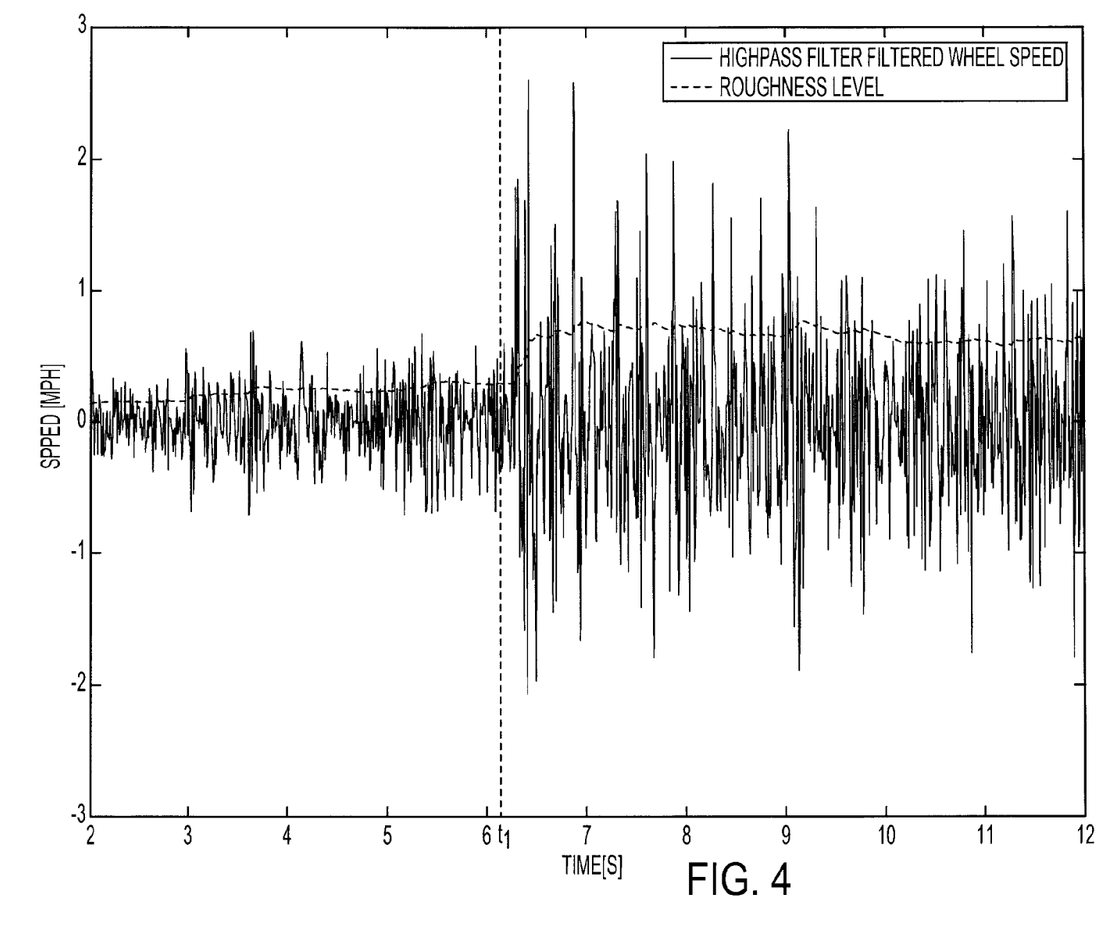
FIG. 4 shows outputs of wheel speed of one non-driven wheel after being processed by various components of the rough road detector of FIG. 2.

FIG. 4 shows outputs of wheel speeds from non-driven wheels after being processed by different components of a rough road detector. The solid line shows outputs from high pass filter 52. Compared to raw wheel speeds shown in FIG. 3, signals shown by the solid line indicate that the slow changing components of the wheel speeds are removed by high pass filter 52. The dashed line shows the outputs from component 58 where the square root of the results from rolling average filter 56 are taken. The dashed line shows that the rough road detector changes wheel speed signals into usable positive quantities to indicate an average roughness level. In the example shown in FIG. 4, the rough road detector determines two roughness levels, where the roughness level of the road surface after t1 is greater than the roughness level of the road surface before t1.

Figure 5:
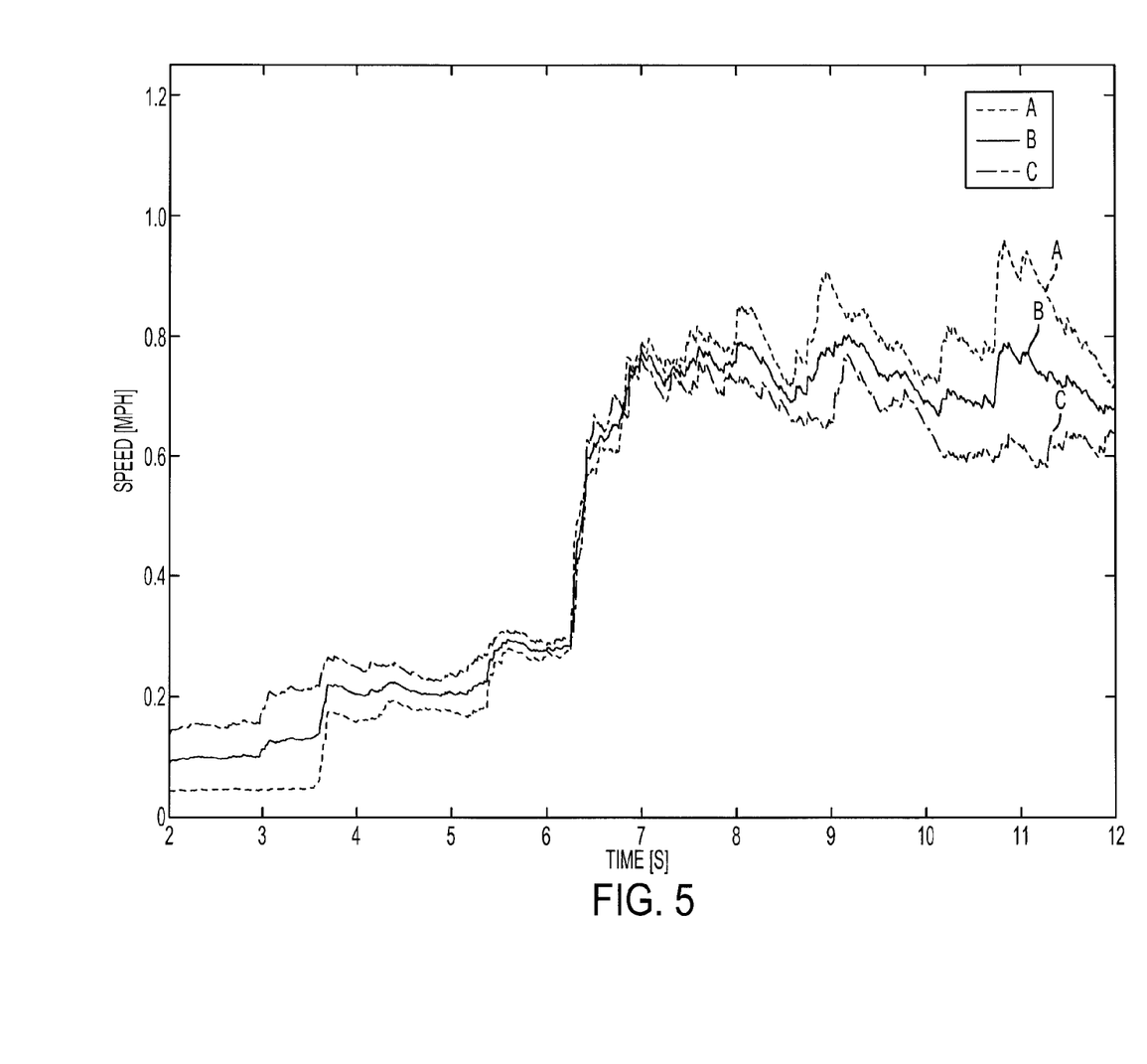
FIG. 5 shows roughness levels determined by the rough road detector of FIG. 2.

FIG. 5 shows exemplary roughness levels determined by a rough road detector. Curve A shows a roughness level determined based on wheel speeds from a right non-driven wheel. Curve C shows a roughness level determined based on wheel speeds from a left non-driven wheel. Curve B shows an average roughness level based on determination from left and right non-driven wheel speeds. The average roughness level may be obtained by averaging the roughness levels determined based on wheel speeds from right and left wheels. Alternatively, if the wheel speeds from one wheel is not valid, the roughness level determined from the wheel speeds of another wheel may be used.

Referring again to FIG. 2, rough road detector 14 may include a comparator 62. After a roughness level is determined by third computation component 60, the roughness level is compared with a threshold in comparator 62. The threshold may be calibrated to known surfaces for which false diagnostic errors of a diagnostic component may occur. As discussed above, in one example the diagnostic component may be a misfire monitor configured to detect ignition misfires. Thus, the threshold may be calibrated to roads such as cobblestones, or roads with potholes and bumps, where the misfire monitor is prone to produce false errors. Further, the threshold may be tuned so that it is not sensitive to normal pavement. In some embodiments, the roughness of a road surface may have a scale of 0.0 to 1.0 where 1.0 represents the roughest road and 0.0 represents the smoothest road. Alternatively, other suitable scales could be used, such as scales that extend above 1.0.

Figure 6:
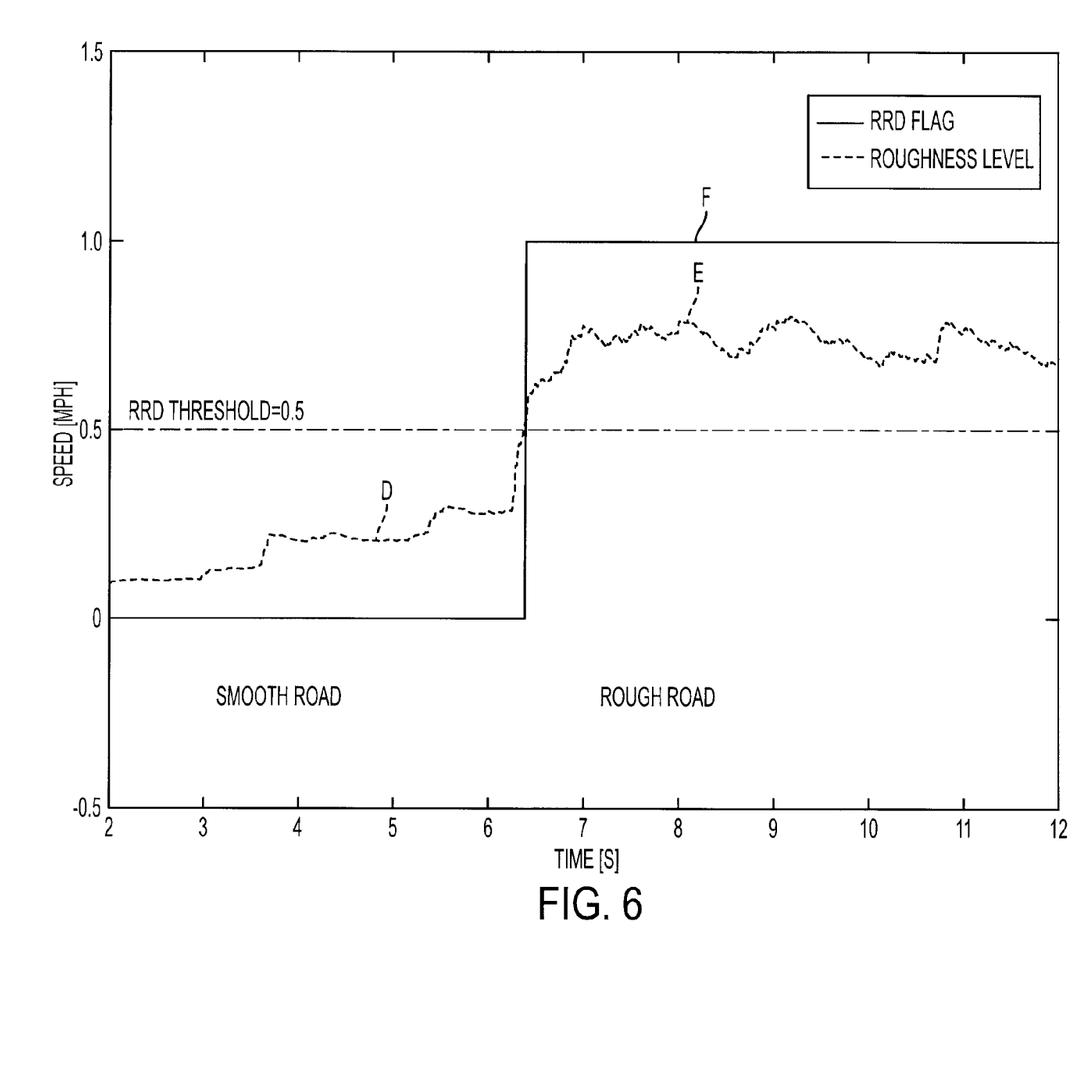
FIG. 6 illustrate roughness flag set by the rough road detector of FIG. 2, based on a roughness level of a road surface.

After the roughness level is compared to the threshold, roughness of the road condition may be declared. FIG. 6 illustrates roughness flags set by a rough road detector based on roughness level of a road surface. Line E shows the roughness level. Lines D and F show rough road detector flags (RRD flag). In the example, a threshold is determined to be 0.5. Before time t1, the roughness level is less than the threshold. The output from comparator 62 is zero or RRD flag is set to be zero. Thus, the road may be declared as "smooth road." After t1, the roughness level is greater than the threshold. The output from comparator 62 is 1.0 and RRD flag is set. As a result, the road may be declared as "rough road." Then, the RRD flag may be sent to a diagnostic component. While the depicted embodiment shows a threshold separating two roughness levels, smooth and rough, it will be appreciated that a plurality of thresholds may be set, delineating a plurality of roughness levels. For example, two thresholds may separate three roughness levels. The first roughness level may correspond to a smooth road. The second roughness level may correspond to a Belgian block road. The third roughness level may correspond to a brick road. Other types of roads such as harshness road, random bump road, and cobble stone road may have separate roughness levels determined by the rough road detector.

The use of a rough road detector can reduce false errors from a diagnostic component. In the case where the diagnostic component is a misfire monitor, once the misfire monitor receives the RRD flag, a control system may instruct the misfire monitor to disable the misfire output or switch to an alternate calibration of the misfire monitor on the "rough road." Where the rough road detector is configured to determine a roughness of a road from among three or more roughness levels, the output of the detector may be used to completely disable the error output of the diagnostic component in the case of the roughest level, and to partially disable the error output of the diagnostic component in the case of an intermediate roughness level, or otherwise process the error output of the diagnostic component at the intermediate roughness level to inhibit or remove false errors.

Figure 7:
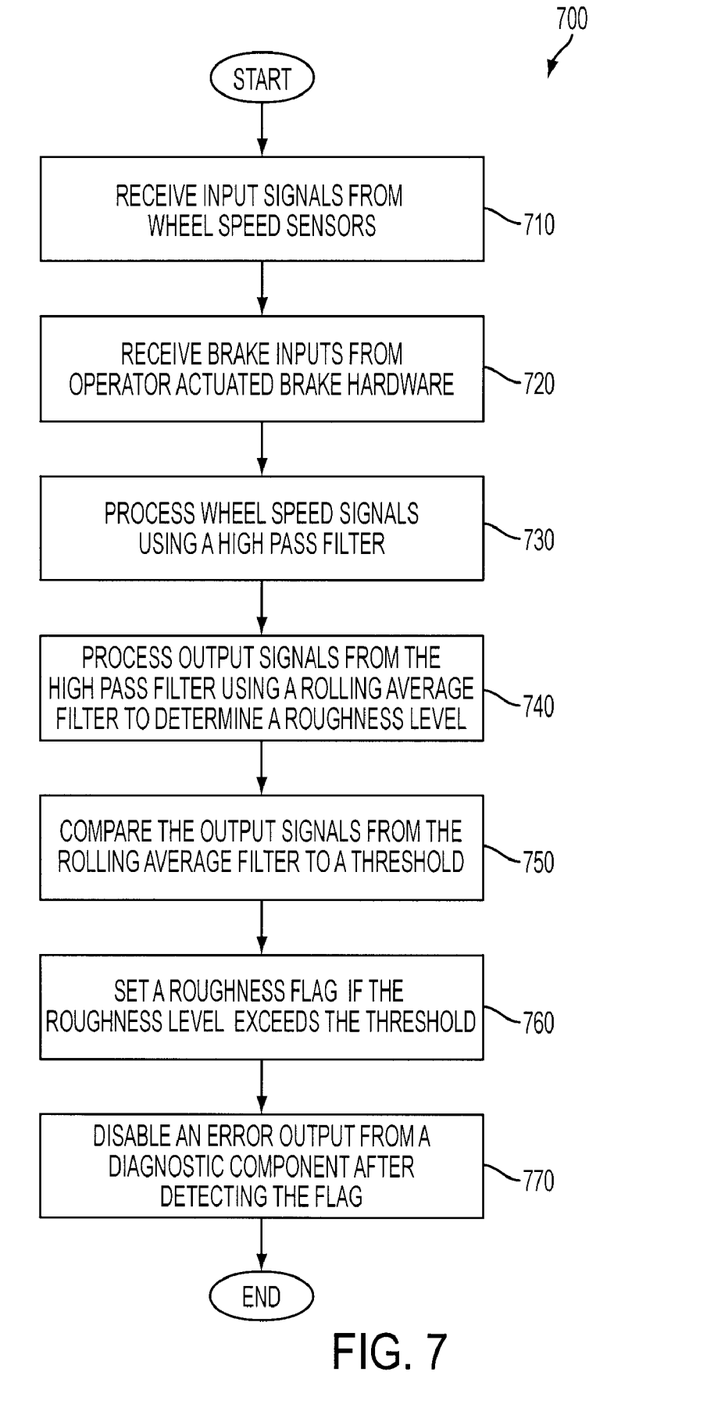
FIG. 7 is a flow chart showing a method to reduce false positive error determinations from a diagnostic component in a vehicle traveling on a road.

FIG. 7 is a flowchart illustrating a method 700 to reduce false positive error determinations from a diagnostic component in a vehicle traveling on a road using a rough road detector. First, the routine, at 710, receives input signals from the wheel speed sensors. As described above, input signals may include speeds from left and right non-driven or driven wheels. Next, the routine, in 720, receives brake inputs from operator actuated brake hardware. Information on brake status may determine whether the rough road detector will be operated as described above with reference to FIG. 1. Then, the routine, at 730, processes wheel speed signals using a high pass filter. The high pass filter filters out slow changing components of wheel speeds and then outputs a current magnitude of roughness of a road surface, as described above. In some embodiments, high pass filter outputs are squared after 730. Next, the high pass filter outputs are processed by a rolling average filter to determine a roughness level over a predetermined response time interval, at 740. In some embodiments, output signals may be processed by taking the square root of the output signals from rolling average filter. Next, at 750, the routine compares output signals from the rolling average filter to a predetermined threshold. Then, at 760, the routine sets a roughness flag if the roughness level exceeds the threshold. When the roughness flag is detected, the routine, at 770, disables an error output from a diagnostic component.

As an alternative to steps 750 and 760, the method may also include comparing the output signals from the rolling average filter to a plurality of predetermined thresholds to determine an appropriate roughness level from a plurality of roughness levels, and set a corresponding flag indicating the appropriate roughness level.

Figure 8:
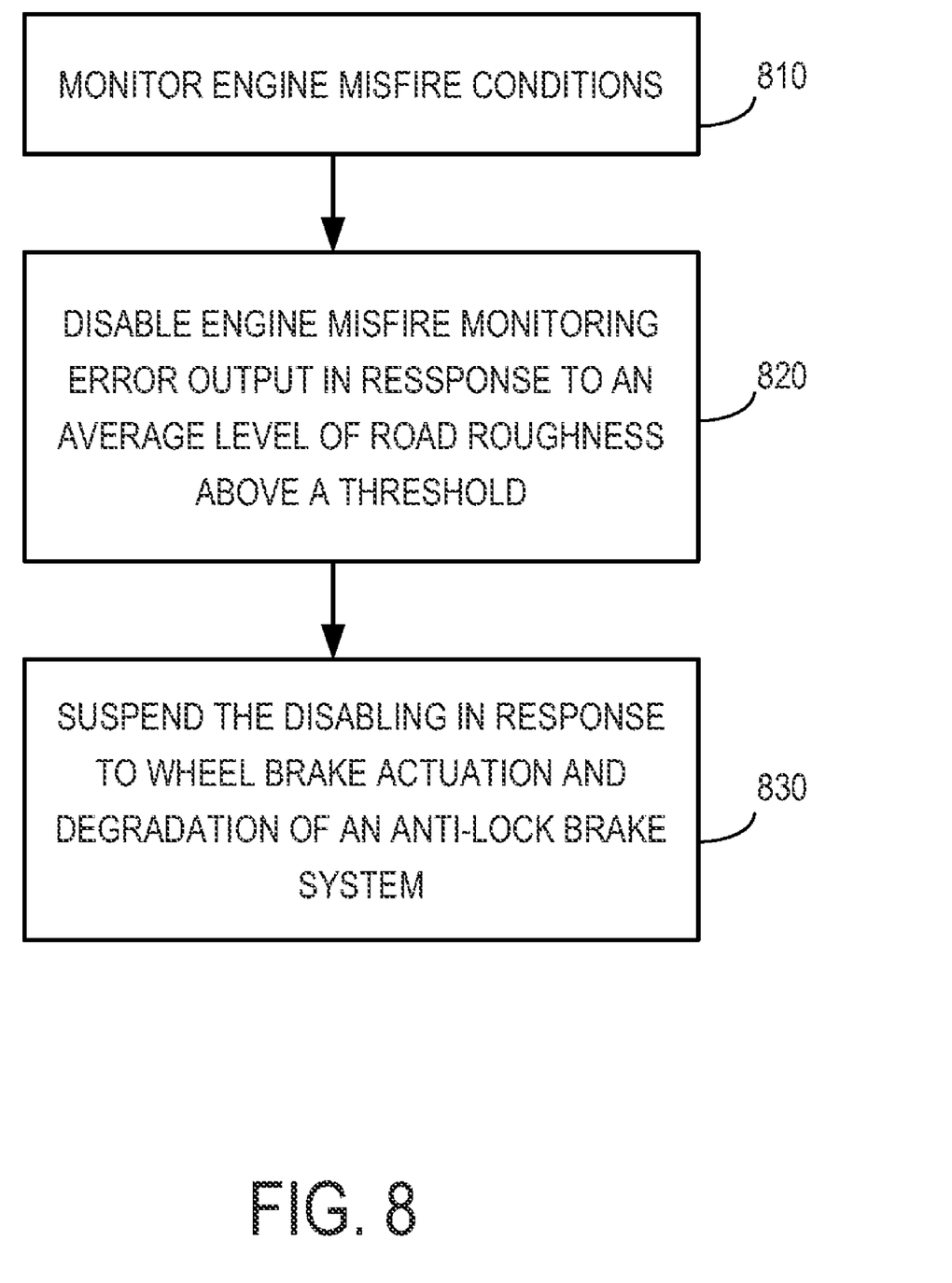
FIG. 8 shows an example method to reduce false positive errors.

In one example, a method shown in FIG. 8 to reduce false positive error determinations includes monitoring engine misfire conditions at 810. At 820, the method includes disabling an engine misfire monitoring error output in response to an average level of road roughness above a threshold. At 830, the method includes suspending the disabling in response to wheel brake actuation and suspending the disabling in response to degradation of an anti-lock brake system, where the average level of road roughness is based on high-pass filtered wheel speed sensor data.

It will be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the various structures, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of methods and system component configurations, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method to reduce false positive error determinations from a diagnostic component in a vehicle traveling on a road, comprising:
  receiving input signals from wheel speed sensors;
  determining changes of the input signals using a high pass filter so that output signals from the high pass filter indicate a current magnitude of external roughness of a road surface;
  processing the output signals from the high pass filter using a rolling average filter so that a roughness level is determined over a predetermined time interval;
  comparing output signals from the rolling average filter to a predetermined threshold; and
  disabling an error output of the diagnostic component if the roughness level has exceeded the predetermined threshold.

2. The method of claim 1, wherein the method further comprises instructing a misfire monitor of an on-board diagnostic system to disable misfire output or switch to an alternate calibration for the diagnostic component when the roughness level has exceeded the predetermined threshold.

3. The method of claim 1, wherein determining changes of the input signals using a high pass filter includes removing semi-steady state components of the wheel speed signals.

4. The method of claim 1, wherein the predetermined time interval used by the rolling average filter is approximately two seconds.

5. A method to reduce false positive error determinations, comprising:
  monitoring engine misfire conditions;
  disabling an engine misfire monitoring error output in response to an average level of road roughness above a threshold the average level of road roughness based on high-pass filtered wheel speed sensor data; and
  suspending the disabling in response to wheel brake actuation and suspending the disabling in response to degradation of an anti-lock brake system.

6. The method of claim 5 wherein suspending the disabling in response to wheel brake actuation includes suspending the disabling in response to the wheel brake actuation being a braking event.

7. The method of claim 6 further comprising applying hysteresis to the average level of road roughness to inhibit undesired disabling of the engine misfire monitoring error output.

* * * * *